May 9, 1933.　　　E. N. HARVEY ET AL　　　1,907,803
MICROSCOPE CENTRIFUGE

Filed Dec. 12, 1931

EDMUND N. HARVEY
ALFRED L. LOOMIS
INVENTORS

BY
ATTORNEY

Patented May 9, 1933

1,907,803

UNITED STATES PATENT OFFICE

EDMUND NEWTON HARVEY, OF PRINCETON, NEW JERSEY, AND ALFRED L. LOOMIS, OF TUXEDO PARK, NEW YORK

MICROSCOPE-CENTRIFUGE

Application filed December 12, 1931. Serial No. 580,562.

This invention relates to optical instruments and more particularly it has reference to a device which is used for viewing objects through a microscope while the objects are being subjected to centrifugal force.

In making certain experimental studies of objects, such as living cells, it has been customary to use the centrifuge (1) for the determination of the relative density and total volume of granules present (2) for the observation of the behavior of mitotic figures and other structures under centrifugal force and (3) for the measurement of the viscosity of the protoplasm. In making such studies and observation, the usual procedure is to centrifuge the cells in capillary tubes, remove them from the tubes and then place them under a microscope to observe what has happened. It would, however, be far better to be able to actually study and observe the cells through a microscope while the cells were under the influence of centrifugal force.

One of the objects of our invention is to provide a device for microscopically viewing an object while it is under the influence of centrifugal force. Another object is to provide a microscope-centrifuge having means for bringing the object and the optical system into proper focal relation. A further object is to provide a device of the character described which will be relatively simple in structure yet efficient in operation. To these and other ends the invention resides in certain features of construction, arrangement and combination of parts as will hereinafter be more fully described.

Referring to the drawing.

Figure 1:
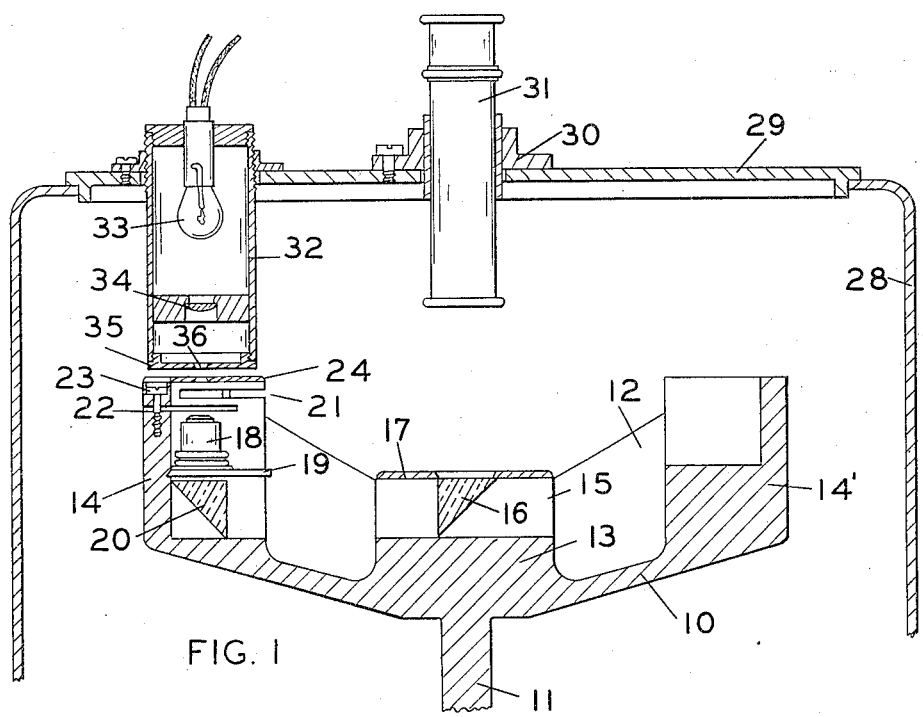
Fig. 1 shows a vertical sectional view of a device embodying our invention.
Figure 2:
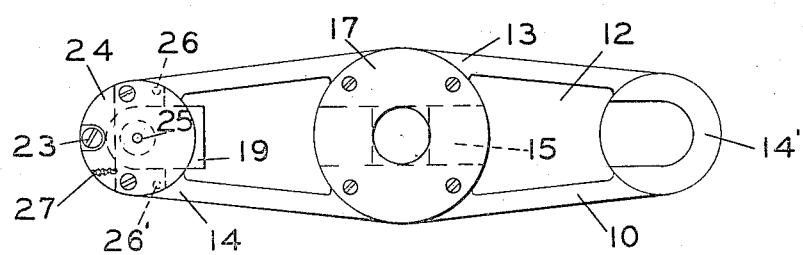
Fig. 2 is a top plan view of the centrifuge head.
Figure 3:
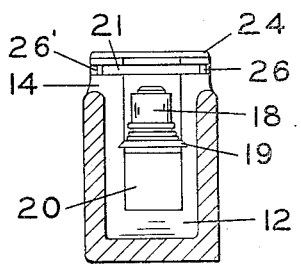
Fig. 3 is a view taken on line 3—3 of Fig. 1.

One embodiment of our invention is illustrated in the drawing wherein 10 indicates, generally, a centrifuge head which is mounted to rotate about a vertical axis 11 by a suitable motor or other means, not shown.

The centrifuge head 10 is preferably formed of a single casting with an internal channel 12, the central boss 13 and the two end portions 14 and 14'. The boss 13 has a slot 15 in which a reflecting prism 16 is held by means of the apertured plate 17 which is secured to boss 13. A microscope objective 18 is carried by the plate 19 which is slidably mounted in grooves formed in end portion 14. A reflecting prism 20 is mounted below the microscope objective in the end portion 14. The upper part of the end portion 14 is slotted as at 21 to provide an opening for receiving a glass slide or container carrying the object which is to be observed. Another slot 22 is also formed so that an object may be adjusted, by means of screw 23, for focusing purposes. Secured to the top of end portion 14 is a plate 24 having an aperture 25 which is in alignment with the optical axis of the objective. Two pins 26 and 26' serve to retain the object slide against lateral movement while the screw 27 adjusts the position of the slide relative to the axis of the centrifuge.

The centrifuge head is mounted within a suitable casing 28 having a removable cover 29. Secured within an opening in cover 29 is a bushing 30 within which a microscope ocular 31 is slidably mounted so that its optical axis coincides with the vertical axis of rotation of the centrifuge. Adjustably mounted within another opening in cover 29 is a tube 32 carrying a light source, such as an incandescent lamp 33, and a lens 34. The lower end of tube 32 is closed by a plate 35 having a central aperture 36 which is positioned from the axis of the centrifuge the same distance as is the aperture 25.

In operation, the object to be observed is placed in a suitable glass container or slide which is positioned in slot 21. The lamp 33 is illuminated and the centrifuge head is rotated about its axis. As the centrifuge rotates, the object on the slide is illuminated for an instant each time that the aperture 25 passes under aperture 36. Light rays from the object pass through the objective 18, are successively reflected by prisms 20 and 16 and then pass into the ocular 31. Thus, the object is intermittently illuminated so that, even though it is in motion, the image observed in the ocular 31 appears stationary. Various magnifications can be obtained by the use of different oculars and objectives. It is preferable to employ objectives that are parfocal so that very little, if any, focusing adjustments are necessary. By carefully balancing the centrifuge head so as to reduce vibration, it is possible to obtain steady images even at relatively high magnifications. Satisfactory photomicrographs have been taken of bacteria and chromosomes in dividing cells, using a x62 objective.

From the foregoing, it will be apparent that we are able to attain the objects of our invention and provide a device whereby objects under the influence of centrifugal force may be viewed through a microscope. Various modifications can obviously be made without departing from the spirit of our invention as pointed out in the appended claims.

We claim:

1. A device of the character described comprising a rotatable member having a holder for an object to be subjected to centrifugal force, optical means for providing an enlarged image of the object while under the action of centrifugal force, said means comprising objective means and ocular means, said objective means being mounted on said member.

2. An apparatus of the type described comprising a rotatable arm, an object holder mounted at one end of said arm, a microscope objective mounted on said arm beneath said object holder, an ocular mounted above and independently of said arm and reflecting means carried by said arm for directing light rays from said objective to said ocular.

3. In a device of the character described, the combination of a rotatable arm having a vertical rotation axis, a container mounted at one end of said arm, an objective mounted on said arm adjacent to and beneath the plane of said container, an ocular mounted in alignment with said rotation axis and reflecting means carried by said arm for directing light rays from said objective to said ocular.

4. An apparatus of the character described comprising an arm, means for rotating said arm about a vertical axis, a container carried by said arm, a microscope objective mounted on said arm adjacent to said container and adapted to receive light rays therefrom, an ocular mounted adjacent to said arm with its optical axis in alignment with said vertical axis and means for directing light rays from said objective to said ocular.

5. In a device of the type described, the combination of a rotatable arm, a container mounted at one end of said arm, an objective lens mounted on said arm adjacent to said container in position to receive light rays therefrom, an ocular mounted independently of said arm, the axis of said ocular being coincident with the rotation axis of said arm, reflecting means carried by said arm for directing light rays from said objective to said ocular and means for periodically illuminating said container during the rotation of said arm.

6. An apparatus of the type described comprising a rotatably mounted arm, a movable object holder carried at one end of the arm, an objective mounted on said arm adjacent to said object holder, an ocular operatively associated with said objective and means for moving said holder to bring an object into proper focal relation with said objective and ocular.

7. A device of the type described comprising a rotatable arm having a vertical axis of rotation, an object holder mounted on said arm, a light source mounted adjacent to the path of said holder, an objective mounted on said arm adjacent to said holder in position to receive light rays from the object in said holder, an ocular and reflecting means for directing light rays from said objective into said ocular.

8. A device of the character described comprising a rotatable arm, an object holder mounted on said arm, a light source mounted above the path of said holder whereby said object holder is periodically illuminated during the rotation of said arm, microscopic means for viewing the object in said holder, said means comprising an objective carried by said arm, an ocular fixedly positioned above the arm and optical elements for directing light rays from said objective to said ocular.

9. A device of the character described comprising a rotatable arm having a vertical axis of rotation, an object holder mounted at one end of said arm, means for periodically illuminating an object on said holder during rotation of said arm, said means comprising a light source fixedly mounted above the circular path of the holder, an objective mounted at one end of said arm in position to receive light rays from said holder, an ocular mounted above said arm and reflecting means on said arm for directing light rays from said objective into said ocular.

E. NEWTON HARVEY.
ALFRED L. LOOMIS.